United States Patent [19]

Reinhardt et al.

[11] Patent Number: 4,726,187
[45] Date of Patent: Feb. 23, 1988

[54] CIRCUIT ARRANGEMENT FOR CONTROLLING THE SPEED OF ROTATION OF A HYDROSTATIC MACHINE

[75] Inventors: Peter Reinhardt, Lohr; Karl Hessdörfer, Karlstadt, both of Fed. Rep. of Germany

[73] Assignee: Mannesmann Rexroth GmbH, Fed. Rep. of Germany

[21] Appl. No.: 861,320

[22] Filed: May 9, 1986

[30] Foreign Application Priority Data

May 9, 1985 [DE] Fed. Rep. of Germany ....... 3516768

[51] Int. Cl.⁴ ..................... F16D 31/02; F02D 41/00
[52] U.S. Cl. ........................... 60/448; 91/361; 123/361; 318/310
[58] Field of Search .................... 123/361; 417/22, 24; 91/361; 60/449, 448; 364/153, 154; 318/310, 311

[56] References Cited

U.S. PATENT DOCUMENTS

| | | | |
|---|---|---|---|
| 3,509,326 | 4/1970 | Union | 364/154 |
| 4,180,979 | 1/1980 | Cornell | 60/449 X |
| 4,351,152 | 9/1982 | Reynolds et al. | 60/448 X |
| 4,587,808 | 5/1986 | Watanabe et al. | 318/311 X |
| 4,595,979 | 6/1986 | Arai et al. | 91/361 X |

*Primary Examiner*—William E. Wayner
*Attorney, Agent, or Firm*—Harness, Dickey & Pierce

[57] ABSTRACT

A control for the speed of rotation of a hydrostatic machine in which the controlled variable and generated in a speed controller and is made up of a proportional component and an integrating component is limited by a limiting signal which is also made up of a predetermined basic value and a ramp signal behaving proportionally to the actual pivot angle of the hydrostatic machine. The limiting signal thus limits the output signal of the speed controller so that a rapid response behaviour is obtained and fluctuations in the settling to the desired speed are reduced.

9 Claims, 2 Drawing Figures

CIRCUIT ARRANGEMENT FOR CONTROLLING THE SPEED OF ROTATION OF A HYDROSTATIC MACHINE

BACKGROUND OF THE INVENTION

The invention relates to a circuit arrangement for controlling the speed of rotation of a hydrostatic machine, in particular a secondary-controlled machine connected to a pressure line and having the features set forth in the preamble of claim 1.

If the speed control of the machine is carried out electrically, an electronic speed controller is supplied with the speed desired value and the speed actual value of the hydrostatic machine generated in a tachogenerator or other pickup. Connected to the speed controller is a pivot angle adjustment. The pivot angle of the hydrostatic machine operating as motor for driving a load defines the absorption volume. As long as the working pressure supplied to the machine is constant, the torque of the engine is proportional to the pivot angle. The adjustment can be made with the aid of a control magnet and hydraulic valve with mechanical feedback or also with a servo value and electrical feedback.

If the load is to be accelerated in the speed controller, an output signal (manipulated variable) is generated which increases the pivot angle of the motor and thus the motor torque. The instantaneous difference between the load torque, the motor losses and the motor torque is available as acceleration moment for the drive. The acceleration and thus the speed increase of the load depends on the torque difference and the mass to be accelerated in such a manner that with a maximum pivot angle of the motor arising on corresponding presetting of the speed desired value and with a small load moment and small mass maximum acceleration of the drive is obtained. In such cases the speed increase of the drive takes place too rapidly. Since the adjusting time for adjusting the pivot angle of the motor cannot be shortened to any desired extent, the drive reaches a speed far above the desired speed by the time the pivot angle of the motor can be reduced. Thus, a pronounced overshooting of the speed results in a long settling time until the desired speed is reached.

From this derives the problem underlying the invention of improving the control behaviour of the hydrostatic machine and limiting the settling time in such a manner that the drive is accelerated in dependence upon the load so that the speed fluctuations outlined are avoided.

SUMMARY OF THE INVENTION

Said problem is solved with the features set forth in the characterizing clause of claim 1.

According to the invention a limiting signal is formed which follows the load conditions existing at the drive and continuously varying. The limiting signal is composed of a predetermined fixed value and a ramp signal. Thus, the controller output quantity can change rapidly within a predetermined band so that a correspondingly rapid reaction for the speed control results. If the drive is unable with this rapid change of the controller output quantity to equalise the speed difference between the actual value and desired value, the band is further increased via the ramp signal until the desired speed is reached.

DETAILED DESCRIPTION OF THE PREFERRED EMBODIMENTS

Figure 1:
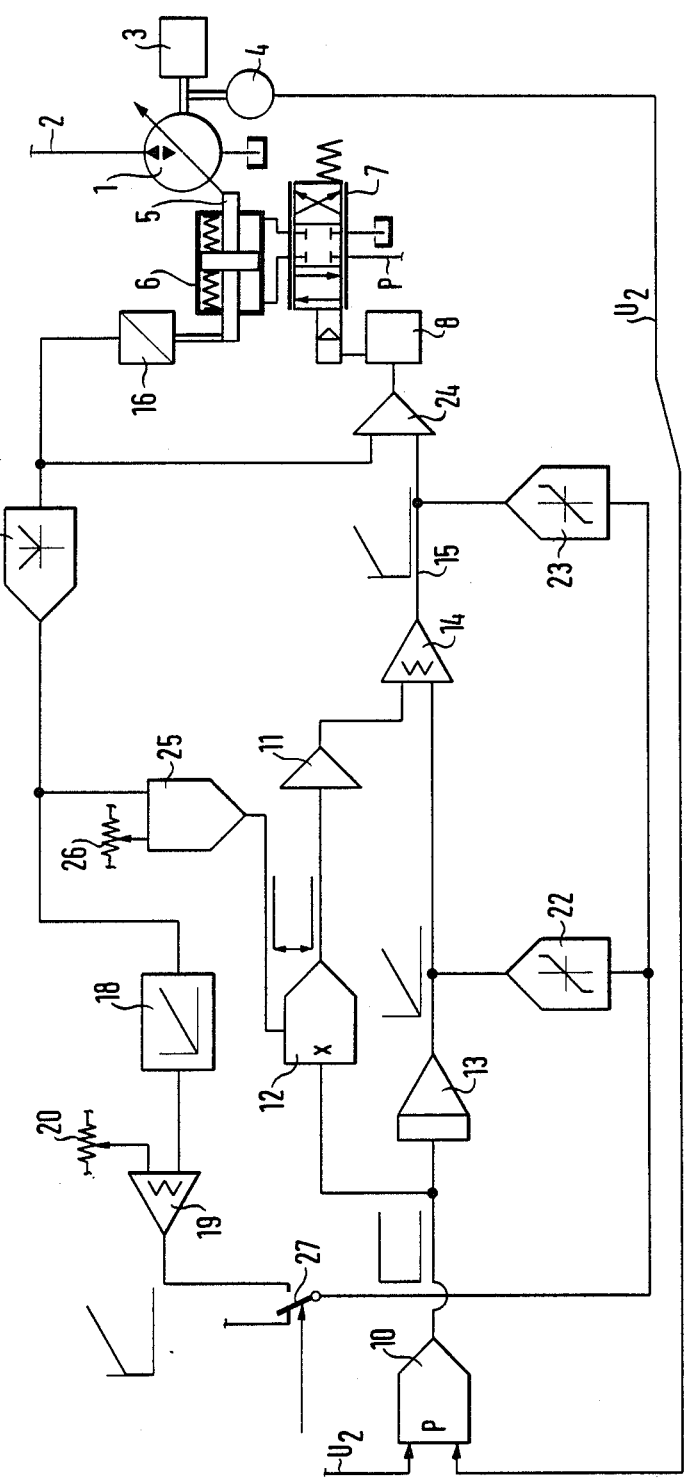
FIG. 1 is a schematic illustration of a circuit arrangement for controlling the speed of rotation of a hydrostatic machine in accordance with a first embodiment of the invention.

A hydrostatic machine 1 with variable volume and pivotal through a zero point into both adjustment regions to function in either a pump or a motor mode is connected in FIG. 1 to a pressure line 2 with impressed pressure. The machine 1 is coupled to a load 3 and a tachogenerator 4 which supplies an actual value signal of the speed. The pivot angle of the machine is adjusted by the piston 5 of the actuating cylinder 6. For this purpose the piston 5 is subjected to fluid via the servo valve 7. The servo valve 7 is electrically actuated via a driver stage 8 to which a position controller output signal is supplied. The controller output signal is formed from the output signal of the speed control circuit present on a line 15 and the position acutal value which is measured by a displacement sensor or pickup 16. In a differential amplifier 24 the two values are compared and the control circuit attempts to bring the two values into coincidence.

The speed controller output signal adjusts the pivot angle of the machine such that via the absorption or delivery volume of the machine 1 at a predetermined torque required by the load 3 a desired speed is reached. The direction of rotation of the machine is predefined by the speed desired value. On acceleration and driving of the load 3 the machine 1 operates as a motor. On retardation or driving from the load it pivots through the zero point into the other adjustment range and can operate as a pump driven by the load and delivering working medium or fluid into the pressure line 2.

The speed controller illustrated in the drawings consists of a differential amplifier 10, to which the speed actual value of the tachogenerator 4 and an abritrarily selected desired value for the speed are supplied; an amplifier 11; a multiplying member 12; an integrating stage 13 and a summation member 14. In the summation member 14 the proportional component of the output quantity of the amplifier 11 and the integrating component of the integrating member 13 are added and thus the output signal of the speed controller present on the line 15 formed. The amplifier 11 provides a signal proportional to the speed difference between the actual value and desired value of the differential amplifier 10 and the integrating stage 13 integrates the speed difference to give an inclined rising signal.

In the multiplying member 12 the magnitude of the proportional component can be varied. The signal forms in the speed controller are illustrated schematically in the drawings showing output with respect to time.

The pivot angle of the machine 1 is measured at a displacement pickup 16. The follow-up loop consists of an absolute value former 17, a ramp former 18, a summation member 19 and limiting members 22 and 23 connected respectively to the integrating member 13 and the summation member 14. The signal supplied by the displacement pickup 16 for the pivot angle of the machine 1 can be negative or positive depending on the pivot angle of the machine or corresponding to the load. In the quantity former 17 the signal is therefore converted independently of its polarity into a signal having only one polarity, i.e. to an absolute value. The output signal of the quantity former is supplied to the ramp former 18 whose output signal is a ramp signal with a predetermined slope, the particular amplitude of the ramp signal reached being proportional to the integration time but tending always to reach the same magnitude as the input signal.

When the pivot angle is pivoted more rapidly than the time base of the ramp former only the ramp former is decisive. If for example the time base of the ramp former is 1% in 10 ms and the pivot angle changes from 0 to 50% in 100 ms then the signal at the output of the ramp former changes in 0.5 s from 0 to 50% because the ramp former has priority. If the pivot angle changes from 0 to 50% in 1 s then the output signal at the ramp former changes from 0 to 50% in 1 s.

The ramp signal is applied to the one input of the summation member 19 and a fixed value set at the potentiometer 20 applied to the other input of the summation member. The output of the summation member 19 thus has the form illustrated in the drawings when the speed controller with the band width available is unable to reach the speed actual value. The voltage set at the potentiometer 20 defines the excess torque which is desired to accelerate the load 3 and results on a speed desired value increase in an abrupt increase in the pivot angle of the machine, i.e. defines the maximum acceleration of the load, whereupon if the speed desired value us not reached in accordance with the ramp signal a slower adjustment of the pivot angle and thus increase of the torque takes place.

The amplitude of the output signal of the summation member 14 is limited in the limiting members 22 and 23. The limiting members are bipolar and thus limit the output signal of the integrating stage 13 and of the summation member 14 in both adjustment ranges of the output signal of the speed controller. With the limiting member 22 the output signal of the integrating member 13 is caused to follow up, i.e. in other words the output signal cannot become greater than the particular value defined by the limiting member 22. Likewise, the output signal of the summation member 14 present on the line 15 is limited by the limiting member 23 to the particular magnitude of the signal defined by the limiting member 23.

Since the output signal of the summation member 19 represents the instantaneous actual value of the pivot angle in the form of the ramp signal plus the fixedly set basic value for a specific pivot angle, the summation member 19 determines the particular controller band which increases with increasing pivot angle and decreases with decreasing pivot angles. With this circuit it is achieved that at a certain speed difference entered at the amplifier 10 between the desired value and actual value the output quantity of the summation member 14 is abruptly increased by the basic value set at the potentiometer 20, giving a corresponding acceleration of the motor. Thereafter the controller output signal is slowly further increased in accordance with the ramp signal supplied by the ramp former 18 until the desired speed is reached. As a result when there is a speed difference firstly a rapid reaction is achieved in the sense of increasing the pivot angle and secondly thereafter the controller output signal is increased slowly up to the desired speed so that overshootings due to too rapid acceleration are avoided.

The multiplication factor of the multiplying member 12 is changed in accordance with the pivot angle of the machine. For this purpose a summation member 25 is connected to the quantity former 17 and its output signal is applied to the multiplying member 12. At zero pivot angle the proportional amplification thereof depends on the value set at the potentiometer 26. When the pivot angle increases the amplification factor increases. As a result, at a small pivot angle of the machine the amplification does not drop below a minimum amplification of the proportional component of the controller output signal. By feedback of the pivot angle into the proportional branch of the speed controller the control quality is increased because the pivot angle is a measure of the magnitude of the load 3 and the maximum amplification which can be reached of the proportional component in the control circuit depends on the load. For large pivot angles the proportional component is therefore increased in the multiplying member 12.

The speed controller is actuated via a switch 27 when the switch 27 is in the position drawn, the output signal on the line 15 is limited to zero. On actuation of the switch 27 the controller is enabled.

In hydrostatic machines in which no displacement pickup is provided as controlled variable for the quantity former 17 the output signal on the line 15 may also be usd.

Even if the speed 0 is preset for the machine 1 a differential signal is inevitable at the output of the amplifier 10, although very small, and this signal is added by the integrating member 13 over a relatively long period of time until an output quantity is reached to which the speed control responds. This is not desirable for drives in which the machine 1 without other aids, for example in a brake engaging in the stationary condition, is stationary for a relatively long period of time, such as for example in a winch drive in which a load must be held securely and firmly when the speed 0 is preset.

Figure 2:
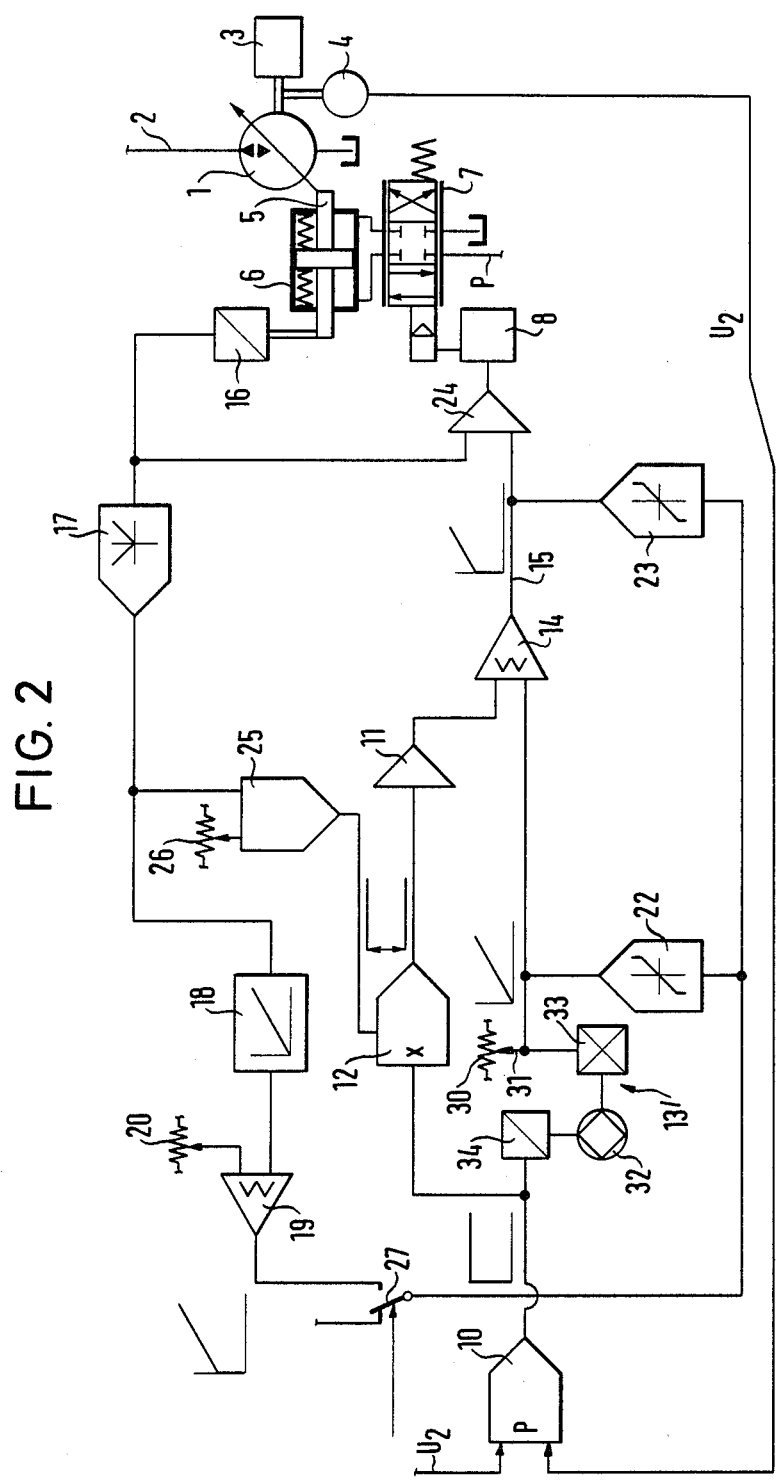
FIG. 2 is a schematic view showing a second embodiment of the invention.

In FIG. 2 identical components are provided with identical reference numerals. The difference compared with FIG. 1 is that, instead of an operational amplifier as integrating member 13, an electromechanical integrating member 13' is provided which consists of a potentiometer 30 whose tap 31 is connected electrically to the input of the summation member 14 a direct current motor 32 via a gearing 33 mechanically adjusts the tap 31. The motor 32 is connected via a converter or driver stage 34 to the differential amplifier 10.

The combination of motor 32 and potentiometer 30 exhibits an integrating behaviour because the voltage at the tap 31 varies continuously as long as the motor 32 runs. If however the differential signal supplied by the amplifier 10 is less than a predetermined value, the motor 32 cannot start and consequently no adjustment of the tap 31 takes place. In contrast to FIG. 1 the tap voltage of the potentiometer 30 does not change and consequently cannot move the machine 1 as long as the input signal supplied to the converter 34 is less than the voltage necessary to start the motor 32.

What is claimed is:

1. A circuit arrangement for controlling the speed of rotation of a hydrostatic machine connected to a pressure line comprising an actuator for adjusting the hydrostatic machine for setting its speed, a speed controller coupled to said machine and to which a speed actual value and an arbitrarily settable speed desired value are supplied, said speed controller generates a control signal for driving said actuator, characterized in that the output signal of the speed controller comprises a component proportional to the input quantity and a component integrating the input quantity, means for forming a limiting signal consisting of a predetermined basic value to which is added a ramp signal proportional to a measured variable proportioned to the position of said actuator, and said limiting signal being superimposed on the output signal of the speed controller.

2. Circuit arrangement according to claim 1, characterized in that the limiting signal is formed in a follow-up loop consisting of a ramp former, a summation member for the ramp signal generated by the ramp former and proportional to the instantaneous controlled variable and the basic value set at a potentiometer, a limiting member connected to the output of an integrating member of the speed controller and a limiting member connected to the output of a summation member for the proportional and integral component of the speed controller.

3. Circuit arrangement according to claim 1, characterized in that a quantity former is provided for the controlled variable in which a unipolar signal is formed which is independent of the polarity of the controlled variable and which is supplied to the ramp former.

4. Circuit arrangement according to claim 1, characterized in that the means for forming the limiting signals are amplitude limiters.

5. Circuit arrangement according to claim 1, characterized in that an amplifier forms the proportional component of the speed controller includes a multiplying member for varying the proportional component.

6. Circuit arrangement according to claim 5, characterized in that the controlled variable is connected via a summation means to the multiplying member, and on increasing the adjustment a larger signal is supplied to the multiplying member.

7. Circuit arrangement according to claim 1, characterized in that the controlled signal is generated by a pickup on the actuator of the machine.

8. Circuit arrangement according to claim 1, characterized in that the controlled signal comprises a limited output signal of the speed controller.

9. Circuit arrangement according to claim 2, characterized in that the integrating member consists of a motor and a potentiometer adjustable by means of said motor, said potentiometer being connected to the summation member and said motor being connected to a differential amplifier for forming a signal for the control deviation.

* * * * *